(12) United States Patent
Riku et al.

(10) Patent No.: US 6,541,567 B1
(45) Date of Patent: Apr. 1, 2003

(54) COATING COMPOSITION FOR INK RECEIVING LAYER FORMATION IMPROVED IN INK FIXABILITY AND WATER RESISTANCE, AND PROCESS FOR THE PRODUCING THE SAME

(75) Inventors: Shuichiro Riku, Ishikawa (JP); Masaru Nakatani, Ishikawa (JP); Hayato Nishita, Ishikawa (JP); Sakae Murata, Ishikawa (JP)

(73) Assignee: Takamatsu Oil & Fat Co., Ltd., Osaka (JP)

(*) Notice: Subject to any disclaimer, the term of this patent is extended or adjusted under 35 U.S.C. 154(b) by 0 days.

(21) Appl. No.: 09/446,500

(22) PCT Filed: Aug. 27, 1997

(86) PCT No.: PCT/JP97/02980
§ 371 (c)(1),
(2), (4) Date: Dec. 21, 1999

(87) PCT Pub. No.: WO99/02350
PCT Pub. Date: Jan. 21, 1999

(30) Foreign Application Priority Data

Jul. 11, 1997 (JP) ............................................. 9-185640

(51) Int. Cl.[7] ................................................ C08L 51/00
(52) U.S. Cl. ............................ 525/70; 525/57; 525/56
(58) Field of Search ............................. 525/57, 58, 59, 525/178; 524/501, 503, 504, 459, 803, 815; 523/500, 502

(56) References Cited

U.S. PATENT DOCUMENTS 5,070,121 A * 12/1991 Hinterwaldner et al. ...... 524/31
5,180,624 A * 1/1993 Kojima et al. ............... 428/211
5,270,103 A * 12/1993 Oliver et al. ................. 428/219
5,922,808 A * 7/1999 Hanada et al. ................ 525/58

FOREIGN PATENT DOCUMENTS

| JP | 62-221591 A | * 9/1987 | ............ B41M/5/00 |
| JP | 5-278323 | 10/1993 | |
| JP | 6-143798 | 5/1994 | |
| JP | 8-323943 | 12/1996 | |

* cited by examiner

Primary Examiner—David W. Wu
Assistant Examiner—Rip A. Lee
(74) Attorney, Agent, or Firm—Fish & Richardson P.C.

(57) ABSTRACT

To provide a coating composition for forming an ink-receiving layer which is satisfactory in the fixability and water resistance of inks in ink-jet printing and is excellent in transparency and clearness of recorded images. A coating composition for ink-receiving layer formation is obtained which comprises: an anionic graft polymer (1) obtained by graft-polymerizing (C) from 100 to 60 wt % at least one hydrophilic radical-polymerizable vinyl monomer and from 0 to 40 wt % other copolymerizable vinyl monomer(s) in an aqueous solution or dispersion comprising a mixture of (A) from 100 to 10 wt % water-compatible polyester resin having an average molecular weight of from 4,000 to 30,000 and from 0 to 90 wt % aqueous urethane resin and (B) a poly(vinyl alcohol) having a degree of saponification of from 75 to 100% and a degree of polymerization of from 500 to 5,000; and a modified cationic polymer (2) obtained by mixing (D) a copolymer of from 10 to 100 wt % at least one radical-polymerizable vinyl monomer having a catonic quaternary ammonium salt group as a side chain and from 90 to 0 wt % other copolymerizable vinyl monomer(s) with (E) a poly(vinyl alcohol) having a degree of saponification of from 75 to 100% and a degree of polymerization of from 500 to 5,000.

5 Claims, No Drawings

COATING COMPOSITION FOR INK RECEIVING LAYER FORMATION IMPROVED IN INK FIXABILITY AND WATER RESISTANCE, AND PROCESS FOR THE PRODUCING THE SAME

TECHNICAL FIELD

The present invention relates to a coating composition for ink-receiving layer formation improved in the fixability and water resistance of inks and a process for producing the same. More particularly, this invention provides a coating composition which, when applied to a substrate such as, e.g., a plastic film, synthetic paper knitted or woven fabric, nonwoven fabric, paper, or metal, gives an ink-receiving layer satisfactory in printability and the fixability and water resistance of inks in ink-jet printing, and further provides a process for producing the composition.

BACKGROUND ART

Ink-jet recording is much utilized recently in various facsimile telegraphs and printers because of its advantages, for example, that high-speed recording is possible, that the impact noise is slight because the printing head does not come into contact with the printing substrate, that various printing substrates including plain paper are usable, and that color recording is possible.

The printed images are required to be high-contrast clear images free from ink running. Because of this, in the case where a printing substrate other than paper, such as a plastic film or synthetic paper, is used, an ink-receiving layer is formed on a surface of the substrate by coating. An ink-receiving layer is required to quickly absorb an ink, fix the absorbed ink, and impart water resistance to the print surface.

Ink-receiving layers have been proposed which contain a cationic compound as an ink fixative so as to meet those requirements. For example, a recording medium comprising a poly(vinyl acetal) resin and a cationic compound as essential components is proposed in Unexamined Published Japanese Patent Application 7-61113. Furthermore, an ink-receiving layer comprising a mixture of poly(vinyl alcohol), polyvinylpyrrolidone, and a vinyl acetate homopolymer and/or a vinyl acetate copolymer and, incorporated in the mixture, a quaternary ammonium compound is proposed in Unexamined Published Japanese Patent Application 7-68926.

However, the above-described techniques still have unsolved problems concerning ink running, etc. attributable to insufficient adhesion to the printing substrate and the insufficient water resistance of the film. In addition, no ink-receiving layer has been obtained so far which is fully satisfactory in ink drying property.

An object of the present invention is to obtain a coating composition eliminating the problems described above and giving an ink-receiving layer for ink-jet recording which is satisfactory in transparency, ink absorbing properties, and the fixability and water resistance of inks.

DISCLOSURE OF THE INVENTION

The present inventors made intensive studies in order to eliminate the above-described problems and, as a result, have achieved the present invention.

The present invention discloses a coating composition for forming an ink-receiving layer showing satisfactory ink absorbing properties, enabling the formation of clear images free from ink running, and excellent in the fixability and water resistance of inks, which comprises: an anionic graft polymer (1) obtained by graft-polymerizing (C) from 100 to 60 wt % at least one hydrophilic radical-polymerizable vinyl monomer and from 0 to 40 wt % other copolymerizable vinyl monomer(s) in an aqueous solution or dispersion comprising a mixture of (A) from 100 to 10 wt % water-compatible polyester resin having an average molecular weight of from 4,000 to 30,000 and from 0 to 90 wt % aqueous urethane resin and (B) a poly(vinyl alcohol) having a degree of saponification of from 75 to 100% and a degree of polymerization of from 500 to 5,000; and a modified cationic polymer (2) obtained by mixing (D) a copolymer of from 10 to 100 wt % at least one radical-polymerizable vinyl monomer having a cationic quaternary ammonium salt group as a side chain and from 90 to 0 wt % other copolymerizable vinyl monomer(s) with (E) a poly(vinyl alcohol) having a degree of saponification of from 75 to 100% and a degree of polymerization of from 500 to 5,000. The present invention further discloses a process for producing the coating composition.

It is generally known that in ink-receiving layers for ink-jet recording, enhanced ink absorbing properties result in reduced water resistance and, conversely, improved water resistance results in reduced ink absorbing properties and impaired ink drying properties to arouse problems such as reduced image quality due to ink running or beading.

In order to eliminate such problems, the present inventors previously proposed the formation of an ink-receiving layer having a two-layer structure composed of anionic and cationic layers. However, the inventors have lately found that the properties of the two-layer structure can be attained with a single fluid. The present invention has been achieved based on this finding.

The composition of the present invention is a coating composition which is a single fluid wherein the anionic polymer in which a hydrophilic vinyl monomer has been graft-polymerized coexists with the cationic polymer surrounded by a poly(vinyl alcohol).

BEST MODES FOR CARRYING OUT THE INVENTION

The present invention will be explained below in detail.

The water-compatible polyester resin used in the present invention is a polyester resin having an average molecular weight of from 4,000 to 30,000.

The water-compatible polyester resin for use in the present invention may be produced by subjecting a dicarboxylic acid and a diol to esterification (transesterification) and polycondensation by a known production technique. However, methods for this production should not be limited in any way.

The dicarboxylic acid ingredient preferably consists mainly of an aromatic dicarboxylic acid, such as terephthalic acid, isophthalic acid, phthalic acid, or naphthalenedicarboxylic acid, or of an ester thereof. This is because use of such dicarboxylic acids has an advantage that the aromatic nuclei of the acids have a high affinity for hydrophobic plastics to thereby improve adhesiveness. In particular, a water-compatible polyester resin produced from terephthalic acid shows tenacious adhesion to molded objects of poly(ethylene terephthalate) type polyesters and is hence a preferred water-compatible polyester resin.

An aromatic dicarboxylic acid such as those shown above or an ester thereof is preferred as the dicarboxylic acid ingredient used for forming the water-compatible polyester resin for use in the present invention. However, an aliphatic dicarboxylic acid such as adipic acid, succinic acid, sebacic acid, or dodecanedioic acid, an alicyclic dicarboxylic acid such as cyclohexyldicarboxylic acid, a hydroxycarboxylic acid such as hydroxybenzoic acid, or an ester of any of these acids may be used, besides those aromatic ingredients, as the dicarboxylic acid ingredient or as a part thereof.

In the case of using an ester, it is a lower-alkyl ester, e.g., a methyl ester or ethyl ester. These esters may be monoesters or diesters.

On the other hand, the diol ingredient to be used may be ethylene glycol, propylene glycol, 1,4-butanediol, 1,6-hexanediol, neopentyl glycol, cyclohexanedimethanol, or a bisphenol.

The water-compatible polyester resin of the present invention is produced through polymerization in such a manner that the molecule thereof contains sulfonic salt groups or carboxylic salt groups as hydrophilic groups so as to impart water solubility or water dispersibility to the resin.

Examples of techniques for incorporating a sulfonic salt include a method in which a dicarboxylic acid component such as, e.g., a 5-sodiumsulfoisophthalate is used as part of the dicarboxylic acid ingredient. The use amount thereof is preferably from 2 to 15 mol % based on the dicarboxylic acid ingredient.

Examples of techniques for incorporating a carboxylic salt include a method in which a polyester containing a carboxylic acid is prepared, for example, by using a polycarboxylic acid containing three or more carboxyl groups as an acid ingredient to be condensed in polyester resin production or by grafting a polymerizable unsaturated carboxylic acid onto a polyester resin, and the polyester containing a carboxylic acid is converted to a salt with a substance forming water-soluble salts together with an alkali metal, any of various amines and ammonium compounds, or the like.

The amount of the carboxylic salt in the polyester resin is preferably in the range of from 15 to 250 KOH-mg/g in terms of the acid value of the polyester resin yielded.

The molecular weight of the water-compatible polyester resin of the present invention is from 4,000 to 30,000 as stated hereinabove. If the molecular weight thereof is below 4,000, resin properties such as water resistance, blocking resistance, and adhesiveness are reduced. If the molecular weight thereof exceeds 30,000, it is difficult to evenly dissolve or disperse the resin in water and the resultant composition tends to gel with the lapse of time.

An especially preferred water-compatible polyester resin has a molecular weight of from 5,000 to 25,000.

The water-compatible polyester resin of the present invention is dissolved or dispersed in water. In the case of a polyester resin containing a sulfonic acid salt, this resin is dissolved or dispersed with stirring in water preferably having a temperature of from 50 to 90° C. In this case, a water-soluble organic solvent maybe used in order to facilitate the dissolution or dispersion of the resin. Examples of the water-soluble organic solvent include lower alcohols, polyhydric alcohols, and alkyl ethers or alkyl esters thereof. Specifically, use can be made of lower alcohols such as methanol, ethanol, n-propanol, and isopropanol, polyhydric alcohols such as ethylene glycol, propylene glycol, diethylene glycol, dipropylene glycol, and glycerol, ethylene glycol monomethyl ether, ethylene glycol monoethyl ether, propylene glycol monomethyl ether, propylene glycol monoethyl ether, propylene glycol acetate, diethylene glycol monomethyl ether, dipropylene glycol monomethyl ether, and the like.

In the case of a polyester resin containing a carboxylic acid salt, this resin is dissolved or dispersed with stirring in water containing an alkaline compound, e.g., ammonia water, sodium hydroxide, potassium hydroxide, or any of various amines, and preferably having a temperature of from 50 to 90° C. In this case also, a water-soluble organic solvent such as those enumerated above may be used.

The aqueous urethane resin for use in the present invention is one obtained by dissolving or dispersing in water a polyurethane resin synthesized from a polyhydroxy compound, a diisocyanate, and a low-molecular weight chain extender containing at least two hydrogen atoms reacting with the diisocyanate. It can be synthesized by a known method. The polyurethane resin means one having in the molecule anionic groups e.g, carboxyl groups, as hydrophilic groups which enable the resin to be dissolved or dispersed in water.

Examples of the polyhydroxy compound used for the urethane resin production include polyester polyols obtained by the dehydrating condensation reaction of an organic acid, e.g., phthalic acid, adipic acid, linoleic acid dimer, or maleic acid, with a glycol, e.g., ethylene glycol, propylene glycol, butylene glycol, or diethylene glycol, trimethylolpropane, hexanetriol, glycerol, trimethylolethane, pentaerythritol, or the like, polyoxypropylene glycol, polyoxybutylene glycol, polytetramethylene glycol, polyoxypropylene triol, polyoxyethylene-polyoxypropylene triol, sorbitol, pentaerythritol, sucrose, starch, polyether polyols produced with an inorganic acid, e.g., phosphoric acid, as an initiator, such as polyoxypropylene polyols and polyoxypropylenepolyoxyethylene polyols, acrylic polyols, castor oil derivatives, tall oil derivatives, and other hydroxylated compounds.

Examples of the diisocyanate include 2,4-tolylene diisocyanate, 2,6-tolylene diisocyanate, m-phenylene diisocyanate, p-phenylene diisocyanate, 4,4'-diphenylmethane diisocyanate, tetramethylene diisocyanate, hexamethylene diisocyanate, xylylene diisocyanate, lysine diisocyanate, isophorone diisocyanate, trimethylhexamethylene diisocyanate, 1,4-cyclohexylene diisocyanate, 4,4'-dicyclohexylmethane diisocyanate, 3,3'-dimethyl-4,4'-biphenylene diisocyanate, 3,3'-dimethoxy-4,4'-biphenylene diisocyanate, 3,3'-dichloro4,4'-biphenylene diisocyanate, 1,5-naphthalene diisocyanate, and 1,5-tetrahydronaphthalene diisocyanate.

Examples of the chain extender include polyols such as ethylene glycol, 1,4-butanediol, trimethylolpropane, triisopropanolamine, N,N-bis(2-hydroxypropyl)aniline, hydroquinone bis(β-hydroxyethyl) ether, and resorcinol bis (β-hydroxyethyl) ether, polyamines such as ethylenediamine, propylenediamine, hexamethylenediamine, phenylenediamine, tolylenediamine, diphenyldiamine, diaminodiphenylmethane, diaminodiphenylmethane, diaminodicyclohexylmethane, piperazine, isophoronediamine, diethylenetriamine, and dipropylenetriamine, hydrazine and analogues thereof, and water.

The poly(vinyl alcohol) for use in the present invention preferably is one which is obtained generally by saponifying poly(vinyl acetate) by the acid saponification method or alkali saponification method and has a degree of saponification of from 75 to 100%. The poly(vinyl acetate) may be a copolymer with up to 5% other copolymerizable monomer (s).

A poly (vinyl alcohol) having a degree of polymerization of from 500 to 5,000 is preferred. A mixture of poly(vinyl alcohol)s differing in degree of polymerization or degree of saponification may be used.

The hydrophilic radical-polymerizable vinyl monomer for use in the present invention may be a monomer having a hydrophilic group represented by any of the following chemical formulae.

(a)

In the above formula, —R is —H or —CH$_3$.
(b) —COOX
In the above formula, X is H, an alkali metal, or an amine.

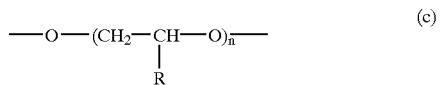
(c)

In the above formula, —R is H or CH$_3$, and n is a positive integer.

(d)

In the above formula, —Y— is

or —CH$_2$— and —R$_1$ and —R$_2$ each is —H, —CH$_3$, —C$_2$H$_5$, —CH(CH$_3$)$_2$, —CH$_2$OH, —C(CH$_3$)$_2$—(CH$_2$)$_n$—A, or —(CH$_2$)$_m$—B, provided that n is 1 or 2; m is 2 or 3; A is —SO$_3$D, —COCH$_3$, —N(CH$_3$)$_2$, or —N$^+$(CH$_3$)$_3$Cl$^-$; D is —H or an alkali metal salt; and B is —N(CH$_3$)$_2$ or —N$^+$(CH$_3$)$_3$Cl$^-$, and that R$_1$ and R$_2$ may be bonded to each other to form a heterocyclic ring.

(e)

In the above formula, —R$_3$, —R$_4$, and —R$_5$ each is —CH$_3$ or —C$_2$H$_5$.

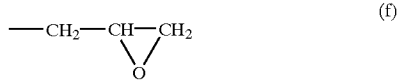
(f)

Specific examples of the hydrophilic radical-polymerizable vinyl monomer for use in the present invention include hydroxylated acrylic esters such as hydroxyethyl acrylate, hydroxyethyl methacrylate, hydroxypropyl acrylate, and hydroxypropyl methacrylate, glycol esters such as ethylene glycol acrylate, ethylene glycol methacrylate, polyethylene glycol acrylate, and polyethylene glycol methacrylate, acrylamide compounds such as acrylamide, methacrylamide, methylolacrylamide, and methoxymethylolacrylamide, glycidyl acrylate compounds such as glycidyl acrylate and glycidyl methacrylate, nitrogen-containing vinyl compounds such as vinylpyridine, vinylimidazole, and vinylpyrrolidone, unsaturated acids such as acrylic acid, methacrylic acid, maleic anhydride, itaconic acid, and crotonic acid and salts of these acids, aminoalkyl acrylates, and aminoalkyl methacrylates.

The above hydrophilic radical-polymerizable monomers may be used alone or as a combination of some of these. A combination of any of these hydrophilic monomers with one or more other vinyl monomers copolymerizable therewith may also be used.

Examples of those other copolymerizable vinyl monomers include vinyl esters such as vinyl acetate and vinyl propionate, vinyl halides such as vinyl chloride and vinyl bromide, esters of unsaturated carboxylic acids, such as methyl acrylate, ethyl acrylate, butyl acrylate, methyl methacrylate, ethyl methacrylate, and butyl methacrylate, vinylsilanes such as dimethylvinylmethoxysilane and γ-methacryloxypropyltrimethoxysilane, and olefin and diolefin compounds such as ethylene, propylene, styrene, and butadiene.

The anionic graft polymer for use in the present invention is obtained by graft-polymerizing from 100 to 60 wt % at least one hydrophilic radical-polymerizable vinyl monomer and from 0 to 40 wt % other copolymerizable vinyl monomer(s) with an aqueous solution or dispersion comprising a mixture of from 100 to 10 wt % the water-compatible polyester resin, from 0 to 90 wt % the aqueous urethane resin, and a poly(vinyl alcohol).

By varying the proportion of the water-compatible polyester resin to the aqueous urethane resin, films having satisfactory adhesiveness to various bases can be formed. Proportions of the water-compatible polyester resin below 10 wt % are undesirable in that light resistance, heat resistance, and the adhesion of pigment inks are impaired.

Proportions of the hydrophilic vinyl monomer below 60 wt % are undesirable in that ink absorbing properties are impaired.

In conducting polymerization for obtaining the anionic graft polymer, a conventionally known method can be used. Examples thereof include a method which comprises adding a polymerization initiator and, if desired, a small amount of an emulsifying agent to an aqueous dispersion comprising a mixture of from 100 to 10 wt % the water-compatible polyester resin and from 0 to 90 wt % the aqueous urethane resin with a poly(vinyl alcohol), gradually adding the radical-polymerizable vinyl monomer thereto while holding the dispersion at 70 to 80° C. with stirring, and then aging the reaction mixture for from 2 to 5 hours to complete the polymerization and thus obtain the anionic graft polymer of the present invention. The radical-polymerizable vinyl monomer graft-polymerizes with the water-compatible polyester resin, aqueous urethan resin, and poly(vinyl alcohol) Consequently, this ingredient has not only excellent ink absorbing properties but properties characteristics of polyester resins and polyurethane resins, such as adhesiveness, water resistance, and toughness.

As the polymerization initiator can be used a general radical polymerization initiator. Examples thereof include water-soluble peroxides such as potassium persulfate, ammonium persulfate, and hydrogen peroxide, oil-soluble peroxides such as benzoyl peroxide and t-butyl hydroperoxide, and azo compounds such as azodiisobutyronitrile.

The proportions of the poly(vinyl alcohol) and the radical-polymerizable vinyl monomer to the water-compatible polyester resin or to a mixture of the water-compatible polyester resin and the aqueous urethane resin are such that the amount of the poly(vinyl alcohol) is from 10 to 500 parts by weight, preferably from 20 to 300 parts by weight, and that of the radical-polymerizable vinyl monomer is from 10 to 500 parts by weight, preferably from 20 to 300 parts by weight, per 100 parts by weight of either the water-compatible polyester resin or the water-compatible polyester resin/aqueous urethane resin mixture on a solid basis.

If the amount of the poly (vinyl alcohol) is below 10 parts by weight, image clearness and ink absorbing properties are impaired. If the amount thereof exceeds 500 parts by weight, water resistance and the adhesiveness of pigment inks are impaired On the other hand, if the amount of the radical-polymerizable vinyl monomer is below 10 parts by weight, ink absorbing properties are impaired. If the amount thereof exceeds 500 parts by weight, water resistance and blocking resistance are impaired.

Examples of the radical-polymerizable vinyl monomer having a cationic quaternary ammonium salt group as a side chain which is used in the present invention include monomers having a quaternary ammonium salt group, such as quaternized aminoalkyl acrylates or methacrylates, e.g., dimethylaminoethyl methacrylate quaternized with methyl chloride or dimethylsulfuric acid, dimethylaminopropyl (meth)acrylamide quaternized with methyl chloride, dimethylsulfuric acid, benzyl chloride, monochloroacetic acid, or the like, quaternized acrylamido-3-methylbutyldimethylamines, vinylbenzylammonium salts, and diallylammonium salts.

Usable examples of other vinyl monomers copolymerizable with the radical-polymerizable vinyl monomer having a cationic quaternary ammonium salt group as a side chain are the same as those enumerated hereinabove.

In the copolymer of from 10 to 100 wt % the radicalpolymerizable vinyl monomer having a cationic quaternary ammonium salt as a side chain and from 90 to 0 wt % other copolymerizable vinyl monomer(s) (hereinafter referred to as "cationic copolymer"), if the content of the radical-polymerizable vinyl monomer having a cationic quaternary ammonium salt as a side chain is below 10 wt %, ink fixability and ink absorbing properties are impaired.

Examples of methods usable for obtaining the cationic copolymer include conventionally known methods. For example, the cationic copolymer can be obtained by dissolving a polymerization initiator and, if desired, a small amount of an emulsifying agent in water, gradually adding the radicalpolymerizable vinyl monomer dropwise thereto while holding the solution at 70 to 80° C. with stirring, and then aging the reaction mixture for from 2 to 5 hours to complete the polymerization.

Usable as the polymerization initiator are peroxides such as benzoyl peroxide, t-butyl hydroperoxide, and hydrogen peroxide and azo compounds such as azodiisobutyronitrile and 2,2'-azobis(amidinopropane) dihydrochloride. Initiators which generate an anionic group, such as potassium persulfate and ammonium persulfate, are undesirable in that the anionic group forms a complex with a cationic monomer.

The cationic copolymer of the present invention has so high film-forming properties that it forms a transparent film upon drying at temperatures not lower than 0° C. The copolymer forms an ion complex with the anionic dye contained in an ink and thus shows an excellent ink-fixing properties.

The modified cationic polymer for use in the present invention is obtained by mixing the cationic copolymer described above with a poly(vinyl alcohol). This poly(vinyl alcohol) can be the above-described one having a degree of saponification of from 75 to 100% and a degree of polymerization of from 500 to 5,000. The surface of the cationic copolymer of the present invention comes to be nonionic upon mixing beforehand with a poly(vinyl alcohol), so that the resultant modified cationic polymer does not readily form an ion complex with the anionic graft polymer of the present invention and can hence be present stably.

The mixing ratio of the cationic copolymer to the poly (vinyl alcohol) is such that the amount of the poly(vinyl alcohol) is from 5 to 200 parts by weight per 100 parts by weight of the cationic copolymer on a solid basis. If the amount of the poly (vinyl alcohol) is smaller than 5 parts by weight, mixing with the anionic graft polymer is impossible. If the amount of the poly (vinyl alcohol) exceeds 200 parts by weight, ink fixabilica, adhesion to substrates, and adhesion of pigment inks are impaired.

The coating composition for ink-receiving layer formation of the present invention is obtained by mixing the anionic graft polymer with the modified cationic polymer. Although methods for mixing are not particularly limited, the most stable coating fluid can be prepared by a method in which an aqueous dispersion of the anionic graft polymer is gradually dropped into an aqueous dispersion of the modified cationic polymer. In the coating fluid prepared by this method, the anionic graft polymer and the cationic polymer never form an ion complex to yield coagulates, and can be stably present. The reason for this may be as follows. Since the anionic polyester resin particles or the urethane resin particles are protected by the grafted polymer and the cationic copolymer also is surrounded by the Poly (vinyl alcohol), both resins independently coexist as fine particles in the same liquid without undergoing adsorption or coagulation. It is thought that after drying and film formation, the film has a sea-island structure in which the cationic ingredient having ink-fixing properties is present as fine particles in the ink-absorbing ingredient. The above can be understood from the fact that this film has far more improved adhesiveness to substrates and water resistance than separately formed films.

The mixing ratio of the anionic graft polymer to the modified cationic polymer is from 50:50 to 95:5 by weight on a solid basis. If the proportion of the modified cationic polymer exceeds 50 wt %, not only printing failures occur in printing with dye type inks but the water resistance and fixability of the inks are impaired. Moreover, such a high proportion of the modified cationic polymer is causative of the curling of polyester film or other substrates after drying. If the proportion of the modified cationic polymer is below 5 wt %, ink fixability is insufficient and water resistance is impaired.

Optional ingredients may be added according to need to the thus-obtained coating composition for ink-receiving layer formation of the present invention. Examples thereof include resin ingredients such as epoxy resins, amino resins, acrylic resins, polyester resins, and urethane resins, crosslinking agents such as isocyanate compounds, epoxy compounds, carbodiimide, and silane coupling agents, inorganic fillers such as silica, alumina, talc, kaolin clay, calcium carbonate, andmica, organic fillers such as fine porous particles of poly(methyl acrylate), polystyrene, or polyacrylonitrile, inorganic and organic pigments such as titanium and chromium compounds, and conventionally known additives such as film-forming aids, thickening agents, leveling agents, antiblocking agents, antistatic agents, ultraviolet absorbers, and antioxidants.

The coating composition for ink-receiving layer formation of the present invention is applied to a substrate, which will be described below, and dried.

Usable as the substrate is a molded object, e.g., a plastic film, or a printing paper, e.g., a synthetic paper. Examples of the plastic film include films of polyesters, polyethylene, polypropylene, PVC, polycarbonates, nylons, polystyrene, cellophane, and triacetate, while examples of the synthetic paper include ones made of polypropylene, polyethylene, polystyrene, and polyesters. It is also possible to apply the composition to paper, textiles such as woven and knitted fabrics, nonwoven fabrics, metals, woods, ceramics, molded articles such as earthenwares, etc.

The coating composition for ink-receiving layer formation of the present invention is generally used in the form of a solution or dispersion based on water or based mainly on water. The concentration thereof is preferably from 10 to 50 wt %. The composition is applied on one or both sides of a printing substrate with an ordinary roll coater, gravure coater, bar coater, knife coater, or the like and dried. The application amount thereof is generally from 2 to 50 $\mu$m, preferably from 5 to 30 $\mu$m, in terms of film thickness after drying. In the case of textiles, nonwoven fabrics, or the like, the processing may be conducted by dipping.

Usable printing inks in ink-jet printing on the ink-receiving layer are water-based and oil-based dye inks and pigment inks. In actual ink-jet printing, ink drops ejected from a nozzle strike on the ink-receiving layer and are absorbed by the layer. An acid dye or pigment in the ink ingredients is fixed by the cationic copolymer contained in the receiving layer. As a result, the ink-receiving layer thus obtained shows satisfactory adhesion to the substrate, is satisfactory in transparency and gloss, and is excellent in the absorption and drying of inks. The image recorded thereon by ink-jet recording is clear and free from ink running and is satisfactory in the fixability and water resistance of the ink. The printed substrate further has satisfactory storage stability.

The coating composition does not necessitate addition of a crosslinking agent or the like thereto, and can basically be used as the single fluid. Since merely applying and then drying the composition enables the resultant film to exhibit the performances described above, a considerable saving of coating cost is attainable. Therefore, the coating composition is useful for forming ink-receiving layers for use in the above application.

The present invention will be explained below in more detail by reference to Examples.

PRODUCTION OF WATER-COMPATIBLE POLYESTERS

Production Example 1

Using zinc acetate and antimony trioxide as catalysts, transesterification was conducted of 0.5 mol of dimethyl terephthalate, 0.45 mol of dimethyl isophthalate, 0.05 mol of dimethyl 5-sodiumsulfoisophthalate, 0.5 mol of ethylene glycol, and 0.5 mol of neopentyl glycol for 3 hours at 170 to 220° C. in a reactor. Thereafter, the inside of the reaction system was gradually evacuated to 5 mmHg over 1 hour while heating the same to 260° C. Polycondensation was then conducted at a reduced pressure (0.2 mmHg) until a given viscosity was obtained. Thus, polyester resin A having a molecular weight of 16,000 was obtained.

Production Example 2

Into the same reactor as in Production Example 1 were introduced 115 parts by weight of dimethyl terephthalate, 75 parts by weight of dimethyl isophthalate, 71 parts by weight of ethylene glycol, and 110 parts by weight of neopentyl glycol together with zinc acetate and antimony trioxide as catalysts. Transesterification was conducted for 3 hours at 140 to 220° C. Polycondensation reaction was then conducted for 30 minutes at 240 to 270° C. and a reduced pressure (10 to 0.2 mmHg). Subsequently, 15 parts by weight of trimellitic anhydride was introduced thereinto to conduct addition reaction for 30 minutes at 170 to 190° C. and ordinary pressure. Thus, polyester resin B having a molecular weight of 5,700 and an acid value of 42 KOH-mg/g was obtained.

Production Example 3

The same composition as in Production Example 1 was reacted, and the reaction product was taken out before the resin viscosity increased. Thus, polyester resin C having a molecular weight of 2,500 was obtained.

The above-described polyester resins A and C each was evenly dissolved in an amount of 160 parts by weight in 240 parts by weight of water with stirring at 65 to 85° C. to obtain aqueous solutions having a solid concentration of 40 wt %.

With respect to the above-described polyester resin B, 160 parts by weight of the resin was evenly dissolved with stirring at 65 to 85° C. in an aqueous solution consisting of a mixture of 200 parts by weight of water containing ammonia water in an amount equivalent to the acid value of the resin and 40 parts by weight of butyl cellosolve to obtain an aqueous solution having a solid concentration of 40 wt %.

PRODUCTION OF ANIONIC GRAFT POLYMERS

Production Examples a to d and Production Examples e to j (Comparative)

Into a reactor equipped with a condenser tube were introduced a water-compatible polyester resin, an aqueous urethane resin, an aqueous poly(vinyl alcohol) solution, and water according to each of the compositions shown in Table 1 given below. Nitrogen gas was fed into the reactor for 20 minutes to sufficiently remove oxygen. Subsequently, an initiator was added and the contents were heated to 70 to 80° C. One or two radical-polymerizable vinyl monomers were added dropwise thereto over 1 hour, and the resultant mixture was aged at that temperature for 3 hours to obtain an anionic graft polymer.

"e" is an example for which a water-compatible polyester having a molecular weight below 4,000 was used.

"f" is an example of an anionic graft polymer not containing a poly(vinyl alcohol).

"g" is an example of an anionic graft polymer in which the poly(vinyl alcohol) amount was above 500 parts by weight per 100 parts by weight of the water-compatible polyester resin.

"h" is an example of an anionic graft polymer in which the proportion of the hydrophilic vinyl monomer in all vinyl monomers was below 60 wt %.

"i" is an example of an anionic graft polymer in which the proportion of the vinyl monomer was above 500 parts by weight per 100 parts by weight of the water-compatible polyester resin.

"j" is an example in which the amount of the water-compatible polyester resin was below 10 wt %.

TABLE 1

| | Production Example | | | | | Production Example (comparative) | | | | |
|---|---|---|---|---|---|---|---|---|---|---|
| | a | b | c | d | e | f | g | h | i | j |
| Aqueous solution of polyester resin A | 25 | 17.5 | | | | 17.5 | | | 11.25 | 1.25 |
| Aqueous solution of polyester resin B | | | 25 | 10 | | | 4 | 10 | | |
| Aqueous solution of polyester resin C | | | | | 17.5 | | | | | |
| Aron Neotan UE-1300[*1] | | 7.5 | | 11.25 | 7.5 | 7.5 | | 11.25 | | 20 |
| 10% Gohsenol GH-17[*2] | 25 | 25 | 25 | 40 | 25 | | 93.8 | 25 | 20 | 40 |
| Hydroxyethyl methacrylate | 5 | 5 | | | 5 | 5 | 2 | | | 5 |
| Acrylic acid | | | 3.5 | 3.5 | | | | 0.5 | 25 | |
| Butyl methacrylate | | | 1.5 | 1.5 | | | | 1.5 | | |
| Potassium persulfate | 0.2 | 0.2 | | | 0.2 | 0.2 | 0.2 | | | 0.2 |
| Ammonium persulfate | | | 0.2 | 0.2 | | | | 0.2 | 0.2 | |
| Water | 44.8 | 44.8 | 44.8 | 33.55 | 44.8 | 69.8 | | 51.55 | 53.55 | 33.55 |

[*1]: Aqueous urethane manufactured by Toagosei Chemical Industry Co., Ltd.; NV, 40%.
[*2]: Poly(vinyl alcohol) manufactured by The Nippon Synthetic Chemical Industry Co., Ltd.; degree of saponification, 86.5–89%; degree of polymerization, 1,700.

Production Example k (Comparative)

A hundred parts by weight of the aqueous dispersion of an anionic graft polymer obtained in Production Example f was mixed with 25 parts by weight of 10% Gohsenol GH-17. (An example in which a poly(vinyl alcohol) was mixed after completion of polymerization)

PRODUCTION OF MODIFIED CATIONIC POLYMERS

Production Examples i and ii and Production Examples iii, iv, and v (Comparative)

Into a reactor equipped with a condenser tube were introduced water and an emulsifying agent according to each of the compositions shown in Table 2 given below. Nitrogen gas was fed into the reactor for 20 minutes to sufficiently remove oxygen. Subsequently, an initiator was added and the contents were heated to 70 to 80° C. Radical-polymerizable vinyl monomers were added dropwise thereto over 2 hours, and the resultant mixture was aged at that temperature for 3 hours and then cooled. After cooling, an aqueous poly(vinyl alcohol) solution was mixed therewith to obtain a modified cationic polymer.

"iii" is an example in which the proportion of the vinyl monomer having a cationic quaternary ammonium salt in all vinyl monomers was below 10 wt %.

"iv" is an example in which the proportion of the poly(vinyl alcohol) was below 5 parts by weight per 100 parts by weight of the cationic copolymer.

"v" is an example in which the proportion of the poly(vinyl alcohol) was above 200 parts by weight per 100 parts by weight of the cationic copolymer.

TABLE 2

| | Production Example | | Production Example (comparative) | | |
|---|---|---|---|---|---|
| | i | ii | iii | iv | v |
| Water | 67.76 | 67.76 | 67.76 | 67.76 | 67.76 |
| Nonion NS-230 (non-ionic emulsifier manufactured by Nippon Oil & Fats Co., Ltd.) | 2 | 2 | 2 | 2 | 2 |
| Quaternized dimethyl-aminoethyl methacrylate | 10 | | 1 | 10 | 10 |
| Quaternized dimethyl-aminopropylacrylamide | | 20 | | | |
| Methyl methacrylate | 15 | 10 | 15 | 15 | 15 |
| Butyl methacrylate | 5 | | 14 | 5 | 5 |
| 2,2'-Azobis(amidinopropane) dihydrochloride | 0.24 | 0.24 | 0.24 | 0.24 | 0.24 |
| Gohsenol NM-14, 10% aqueous solution (poly(vinyl alcohol) manufactured by The Nippon Synthetic Chemical Industry Co., Ltd.; degree of saponification, ≧99%; degree of polymerization, 1,400) | 50 | 50 | 50 | 10 | 800 |
| Total (parts by weight) | 150 | 150 | 150 | 110 | 900 |

PRODUCTION OF COATING MATERIALS FOR INK-RECEIVING LAYER FORMATION

Coating materials for ink-receiving layer formation were obtained by mixing an anionic graft polymer and a modified cationic polymer according to each combination and proportion shown in Table 3. The anionic graft polymer and the modified cationic polymer were mixed after having been regulated with water so as to have a solid content of 12 wt %. The method used for the mixing comprised introducing the modified cationic polymer into a mixing vessel, gradually adding the anionic graft polymer thereto with stirring over 30 minutes, and continuously stirring the resultant mixture for 1 hour after the addition of the whole graft polymer to obtain a coating material. In Comparative Example 9, however, coagulation occurred during the mixing, so that a stable coating material was unable to be prepared. Comparative Example 12 is an example in which an anionic graft polymer was used alone.

TABLE 3

| | Example | | | | | | Comparative Example | | | | | | | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 | 11 | 12 |
| (1) | a | b | c | d | a | b | e | f | g | h | i | j | k | a | a | b | b | d |
| (2) | i | i | i | i | iii | iii | i | i | i | i | ii | ii | ii | iii | iv | v | i | — |
| (1) | 65 | 80 | 60 | 60 | 95 | 90 | 65 | 65 | 65 | 65 | 65 | 65 | 65 | 65 | 65 | 65 | 30 | 100 |
| (2) | 35 | 20 | 40 | 40 | 5 | 10 | 35 | 35 | 35 | 35 | 35 | 35 | 35 | 35 | 35 | 35 | 70 | 0 |

(1): Anionic graft polymer
(2): Modified cationic polymer

COATING MATERIAL APPLICATION EXAMPLES AND PERFORMANCE EVALUATION

1. Examples of Application to Polyester Film

A biaxially stretched polyester film having a thickness of 100 μm was coated with each of the above-described coating materials (Examples 1 to 6 and Comparative Examples 1 to 12) in a coating thickness of 10 μm on a dry basis, and the coating was dried at 100° C. for 5 minutes. The processed films obtained were subjected to the following tests.

1) Adhesion to Polyester Film

According to the crosscut tape test method (JIS K 5400 8.5.2), a pressure-sensitive cellophane tape was applied to the processed surface and then rapidly stripped off in the 180° direction. Thereafter, the resin retention was measured.
  ○: retention, 100%.
  Δ: retention, 99–80%.
  ×: retention, ≦79%.

2) Blocking Resistance

The processed surface was superposed on the unprocessed surface and a load of 1 kg/cm² was imposed thereon. The stacked sheets were allowed to stand for 24 hours under the conditions of 40° C. and 90% RH and then peeled from each other to evaluate the blocking resistance based on the ease or difficulty of peeling.
  ○: no resistance in peeling.
  Δ: slight resistance.
  ×: considerable resistance.

3) Transparency

The degree of clouding of the coated surface was visually judged.
  ○: completely transparent.
  Δ: slightly cloudy.
  ×: completely opaque.

4) Image Clearness

Color ink-jet printer BJC-400J, manufactured by Canon Inc., was used to conduct printing on the processed surface. The printed image was visually examined to judge ink running, color tone, and density.
  ○: no ink running, clear image.
  ×: ink running.

5) Ink Permeability and Drying Property

The time was measured which was required for a printed image to come not to cause ink transfer to a filter paper pressed against the image for 5 seconds under a load of 40 g/cm².
  ○: The ink permeated in 30 seconds, leaving no tackiness.
  ×: The ink did not fully permeate in 30 seconds and remained tacky.

6) Ink Fixability

A printed image was allowed to stand for 1 day, and a drop of water was dropped onto the image with a pipet. After 10 seconds, a load of 40 g/cm² was imposed on the dropped water, which was then wiped away with tissue paper. The degree of ink and film retention was judged.
  ○: Almost no ink was removed.
  Δ: Ink was removed but the film remained.
  ×: Both ink and film were removed.

7) Curling

A processed film was set in an overhead projector and projection was conducted to examine the film for thermal curling.
  ○: no curling.
  ×: curled.

8) Adhesion of Pigment Ink

Color ink-jet printer DJ-850C, manufactured by Hewlett-Packard Co., was used to conduct printing with a black ink which was a pigment ink. The adhesion of the printed part was examined by the crosscut tape test method.
  ○: Almost no ink was removed.
  ×: A considerable proportion of the ink was removed.

The results are as shown in Table 4. Namely, Examples 1 to 6 showed satisfactory performances with respect to all items including ink fixability. In contrast, Comparative Examples 1 to 12 showed insufficient performances.

TABLE 4

| | Example | | | | | | Comparative Example | | | | | | | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 | 11 | 12 |
| Adhesion of PET film | ○ | ○ | ○ | ○ | ○ | ○ | Δ | ○ | × | ○ | ○ | ○ | ○ | ○ | — | × | Δ | ○ |
| Blocking resistance | ○ | ○ | ○ | ○ | ○ | ○ | × | ○ | ○ | ○ | × | ○ | ○ | ○ | — | ○ | ○ | ○ |
| Transparency | ○ | ○ | ○ | ○ | ○ | ○ | ○ | ○ | ○ | ○ | ○ | ○ | × | ○ | — | ○ | ○ | ○ |
| Image clearness | ○ | ○ | ○ | ○ | ○ | ○ | ○ | × | ○ | × | ○ | ○ | ○ | × | — | ○ | × | ○ |
| Ink permeability and drying property | ○ | ○ | ○ | ○ | ○ | ○ | ○ | × | ○ | × | ○ | ○ | ○ | × | — | ○ | ○ | × |

TABLE 4-continued

| | Example | | | | | | Comparative Example | | | | | | | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 | 11 | 12 |
| Ink fixability and water resistance | ○ | ○ | ○ | ○ | ○ | ○ | X | ○ | X | ○ | X | ○ | X | Δ | — | X | X | X |
| Curling | ○ | ○ | ○ | ○ | ○ | ○ | ○ | ○ | ○ | ○ | ○ | ○ | ○ | ○ | — | ○ | X | ○ |
| Adhesion of pigment ink | ○ | ○ | ○ | ○ | ○ | ○ | X | ○ | X | ○ | ○ | X | ○ | ○ | — | X | ○ | ○ |

2. Examples of Application to Synthetic Papers

2-1 Example of Application to Polypropylene Synthetic Paper

To the coating material of Example 1 was added Finesil X-37 (finely particulate silica manufactured by Tokuyama Soda Co., Ltd.; secondary-particle diameter, 3.7 μm) in an amount of 0.2% on a solid basis. After the two ingredients were sufficiently mixed, the resultant mixture was applied to Yupo FPG-130 (manufactured by Oji-Yuka Synthetic Paper Co., Ltd.) in a coating thickness of 10 μm on a dry basis and then dried at 80° C. for 3 minutes. Thus, a coated film having satisfactory gloss and giving a high-grade feeling was obtained. Printing was conducted thereon with color ink-jet printer DJ850C, manufactured by Hewlett-Packard Co. As a result, satisfactory printability and ink fixability were obtained.

2-2 Example of Application to Polyester Synthetic Paper

The same coating material as in 2-1 was applied to a polyester synthetic paper in the same manner as in 2-1. Thus, a coated film having satisfactory gloss and reduced in curling was obtained. The coated film was evaluated for performances in the same manner as in 2-1. As a result, satisfactory performances were obtained as in 2-1.

3. Examples of Application to Papers

3-1 Example of Application to High-Grade Paper (Coated Paper)

To the coating material of Example 2 was added Cal-Lite KT (calcium carbonate manufactured by Shiraishi Kogyo Kaisha, Ltd.; secondary-particle diameter, 2.0 μm) in an amount of 0.5% on a solid basis. After the two ingredients were sufficiently mixed, a high-grade paper which had not undergone cast coating was coated with the resultant mixture in a thickness of 15 μm on a dry basis, and the coating was dried at 80° C. for 3 minutes. Printing was conducted thereon using Picty 300 (color ink-jet printer manufactured by NEC Corp.) in the photo-printing mode. As a result, a high-quality clear printed matter was obtained which was free from ink running or cissing and was equal in gloss to printed matters which had undergone cast coating.

3-2 Example of Application to Other Papers

An information-recording paper, paperboard, corrugated fiberboard, and plain paper were coated with the same coating material as in 3-1 in the same manner as in 3-1. Plain paper was coated also by dipping. Printing was conducted thereon in the same manner as in 3-1. As a result, satisfactory printing results were obtained.

4. Example of Application to Nonwoven Fabrics

A polyethylene nonwoven fabric and a polyester nonwoven fabric each was coated with the coating material of Example 3 in a deposition amount of 12 g/m² on a dry basis, and the coating was dried at 80° C. for 3 minutes. Printing was conducted thereon using Picty 300 in the photo-printing mode. As a result, satisfactory printing results were obtained.

5. Example of Application to Other Films

A soft PVC film, polycarbonate film, and polystyrene film each was coated with the coating material of Example 3 in a coating thickness of 8 μm on a dry basis, and the coating was dried at 80° C. for 2 minutes. With respect to the soft PVC, the coating material of Example 3 was applied after Pesuresin A-124S (modified polyester resin manufactured by Takamatsu Oil & Fat Co., Ltd.) was applied in a thickness of 1 μm for the prevention of plasticizer bleeding. Printing was conducted thereon using Picty 300 in the photo-printing mode. As a result, satisfactory printing results were obtained. Ink fixability was also satisfactory.

6. Example of Application to Textile Products

A 100% cotton woven fabric, 100% cotton knit fabric, polyester/cotton (65/35) mixed woven fabric, 100% polyester woven fabric, 100% nylon woven fabric, and 100% wool woven fabric were used as substrate fabrics. The polyester woven fabric was one which had been hydrophilized with SR-1000 (hydrophilizing agent for polyesters; manufactured by Takamatsu Oil & Fat Co., Ltd.), and the nylon woven fabric was one which had been hydrophilized with Lanogen KRN-6 (hydrophilizing agent for nylons; manufactured by Takamatsu Oil & Fat Co., Ltd.).

The substrate fabrics each was knife-coated with the coating material of Example 1 in a coating amount of 15 g/m² on a dry basis, and the coating was dried at 100° C. for 5 minutes to obtain treated fabrics. Each substrate fabric was then subjected to ink-jet printing and then to a general dyeing step suitable for the dye and substrate fabric. Thus, dyed articles were obtained. The dyed articles obtained were free from ink running, excellent in color tone and density, satisfactory in fastness to laundering, and excellent also in light and heat resistance.

7. Example of Receiving Layer Serving also as Anchor Coat for Back Printing

A 100 μm transparent polyester film was coated with the coating material of Example 1 in a thickness of 3 μm on a dry basis, and the coating was dried at 120° C. for 1 minute. A coating material for back printing (an acrylic resin containing fine porous particles) was applied thereon in a thickness of 15 μm on a dry basis, and the coating was dried at 120° C. for 3 minutes to produce a film for back printing. Separately from the above, the coating material for back coating was applied alone to the same polyester film in a thickness of 15 μm to produce a coated film. These two coated films were compared in performances. The film having an anchor coat formed from the coating material of the present invention was superior in adhesiveness, water resistance, printability, and light transmission to the film having no anchor coat.

POSSIBILITY OF INDUSTRIAL APPLICATION

As described above, the coating composition of the present invention shows satisfactory adhesion even to hydrophobic printing substrates and satisfactory printability in ink-jet printing. In addition, the composition does not impair the transparency of substrates and is satisfactory also in the fixability and water resistance of inks.

Therefore, by applying the coating composition of the present invention to a printing substrate, a clear printed matter free from ink running and satisfactory in ink fixability and water resistance is obtained through ink-jet printing. The composition is hence exceedingly suitable for use in producing ink-jet recording sheets.

What is claimed is:

1. A coating composition for ink-receiving layer formation which comprises: an anionic graft polymer (1) obtained by graft-polymerizing (C) from 100 to 60 wt % at least one hydrophilic radical-polymerizable vinyl monomer and from 0 to 40 wt % other copolymerizable vinyl monomer(s) in an aqueous solution or dispersion comprising a mixture of (A) from 100 to 10 wt % water-compatible polyester resin having an average molecular weight of from 4,000 to 30,000 and from 0 to 90 wt % aqueous urethane resin and (B) a poly(vinyl alcohol) having a degree of saponification of from 75 to 100% and a degree of polymerization of from 500 to 5,000; and a modified cationic polymer (2) obtained by mixing (D) a copolymer of from 10 to 100 wt % at least one radical-polymerizable vinyl monomer having a cationic quaternary ammonium salt group as a side chain and from 90 to 0 wt % other copolymerizable vinyl monomer(s) with (E) a poly(vinyl alcohol) having a degree of saponification of from 75 to 100% and a degree of polymerization of from 500 to 5,000.

2. The coating composition for ink-receiving layer formation of claim 1, wherein the proportions on a solid basis of (A) from 100 to 10 wt % the water-compatible polyester resin and from 0 to 90 wt % the aqueous urethane resin, (B) the poly(vinyl alcohol), and (C) the radical-polymerizable vinyl monomer are such that the amounts of ingredients (B) and (C) are from 10 to 500 parts by weight and from 10 to 500 parts by weight, respectively, per 100 parts by weight of ingredient (A); the proportions on a solid basis of (D) the copolymer of at least one radical-polymerizable vinyl monomer having a cationic quaternary ammonium salt group as a side chain and other copolymerizable vinyl monomer(s) and (E) the poly(vinyl alcohol) is such that the amount of ingredient (E) is from 5 to 200 parts by weight per 100 parts by weight of ingredient (D); and the proportions on a solid basis of (1) the anionic graft polymer and (2) the modified cationic polymer are such that the ratio of the amount of ingredient (1) to that of ingredient (2) is from 50:50 to 95:5 by weight.

3. The coating composition for ink-receiving layer formation of claim 1, wherein hydrophilic radical-polymerizable vinyl monomer is selected from the group consisting of hydroxylated(meth)acrylic esters, glycol esters, (meth)acryl amide compounds, glycidyl (meth)acrylate compounds, vinylpyridine, vinylimidazole, vinylpyrrolidone, acrylic acid, methacrylic acid, maleic anhydride, itaconic acid, crotonic acid, salts of acrylic acid, salts of methacrylic acid, salts of maleic acid, salts of itaconic acid, salts of crotonic acid, aminoalkyl acrylates, and aminoalkyl methacrylates.

4. A coating composition for ink-receiving layer formation, which comprises: (1) an anionic graft polymer aqueous composition and (2) a cationic polymer aqueous composition, wherein said anionic graft polymer aqueous composition (1) is obtained by graft polymerizing from 100 to 60 wt % of at least one hydrophilic radical-polymerizable vinyl monomer and from 0 to 40 wt % of other copolymerizable vinyl monomer(s) in an aqueous solution or dispersion comprising a mixture of from 100 to 10 wt % of water-compatible polyester resin having an average molecular weight of from 4,000 to 30,000 and from 0 to 90 wt % of aqueous urethane resin, a poly(vinyl alcohol) having a degree of saponification of from 75 to 100% and a degree of polymerization of from 500 to 5,000, and water, and wherein said cationic polymer aqueous composition (2) is obtained by mixing a copolymer of from 10 to 100 wt % of at least one radical-polymerizable vinyl monomer having a cationic quaternary ammonium salt group as a side chain and from 90 to 0 wt % of other copolymerizable vinyl monomer(s) with a poly(vinyl alcohol) having a degree of saponification of from 75 to 100% and a degree of polymerization of from 500 to 5,000.

5. The coating composition for ink-receiving layer formation of claim 4, wherein the proportions on a solid basis of (A) from 100 to 10 wt % the water-compatible polyester resin and from 0 to 90 wt % the aqueous urethane resin, (B) the poly(vinyl alcohol), and (C) the radical-polymerizable vinyl monomer are such that the amounts of ingredients (B) and (C) are from 10 to 500 parts by weight and from 10 to 500 parts by weight, respectively, per 100 parts by weight of ingredient (A); the proportions on a solid basis of (D) the copolymer of at least one radical-polymerizable vinyl monomer having a cationic quaternary ammonium salt group as a side chain and other copolymerizable vinyl monomers(s) and (E) the poly(vinyl alcohol) is such that the amount of ingredient (E) is from 5 to 200 parts by weight per 100 parts by weight of ingredient (D); and the proportions on a solid basis of (1) the anionic graft polymer and (2) the modified cationic polymer are such that the ratio of the amount of ingredient (1) to that of ingredient (2) is from 50:50 to 95:5 by weight.

\* \* \* \* \*